(12) United States Patent
Brown et al.

(10) Patent No.: US 7,266,613 B1
(45) Date of Patent: Sep. 4, 2007

(54) FAST DYNAMIC MEASUREMENT OF BANDWIDTH IN A TCP NETWORK ENVIRONMENT

(75) Inventors: Thomas B. Brown, Redwood Shores, CA (US); David del Val, Madrid (ES); Anders E. Klemets, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 512 days.

(21) Appl. No.: 09/635,988

(22) Filed: Aug. 9, 2000

(51) Int. Cl.
*G06F 15/16* (2006.01)
*G06F 15/173* (2006.01)

(52) U.S. Cl. .................. 709/235; 709/223; 709/228; 709/232; 709/238

(58) Field of Classification Search ........ 709/231–237, 709/223, 228, 238; 370/230, 230.1
See application file for complete search history.

(56) References Cited

U.S. PATENT DOCUMENTS

| | | | |
|---|---|---|---|
| 4,963,995 A | 10/1990 | Lang | |
| 5,057,932 A | 10/1991 | Lang | |
| 5,132,964 A * | 7/1992 | Esaki | 370/418 |
| 5,164,839 A | 11/1992 | Lang | |
| 5,262,875 A | 11/1993 | Mincer et al. | |
| 5,440,334 A | 8/1995 | Walters et al. | |
| 5,568,181 A | 10/1996 | Greenwood et al. | |
| 5,710,970 A | 1/1998 | Walters et al. | |
| 5,758,076 A | 5/1998 | Wu et al. | |
| 5,787,472 A | 7/1998 | Dan et al. | |
| 5,835,495 A | 11/1998 | Ferriere | |
| 5,872,920 A * | 2/1999 | Hausman et al. | 709/250 |
| 5,890,010 A | 3/1999 | Nishigami | |
| 5,913,038 A | 6/1999 | Griffiths | |
| 5,931,961 A | 8/1999 | Ranganathan et al. | |
| 5,963,202 A | 10/1999 | Polish | |
| 5,978,567 A | 11/1999 | Rebane et al. | |
| 5,983,263 A | 11/1999 | Rothrock et al. | |
| 5,995,705 A | 11/1999 | Lang | |
| 5,996,015 A | 11/1999 | Day et al. | |
| 6,005,621 A | 12/1999 | Linzer et al. | |
| 6,014,706 A | 1/2000 | Cannon et al. | |

(Continued)

OTHER PUBLICATIONS

Gunningberg et al., "How a large ATM MTU causes deadlocks in TCP data transfers", IEEE/ACM Transactions on Networking, vol. 3 Issue: 4 , Aug. 1995, pp. 409-422.*

(Continued)

*Primary Examiner*—Abdullahi Salad
*Assistant Examiner*—Hussein A El-chanti

(57) ABSTRACT

The fast dynamic measurement of bandwidth in a TCP network environment utilizes a single pair of packets to calculate bandwidth between two entities on a network (such as the Internet). This calculation is based upon the packet-pair technique. This bandwidth measurement is extremely quick. On its journey across a network, communication devices may delay the packet pairs. In particular, TCP networks have two algorithms designed to delay some packets with the goal of increasing the overall throughput of the network. However, these algorithms effectively delay a packet pair designed to measure bandwidth. Therefore, they distort the measurement. These algorithms are Nagle and Slow Start. The fast dynamic measurement of bandwidth implements countermeasures to overcome the delays imposed by these algorithms. Such countermeasures include disabling the application of the Nagle Algorithm; minimizing the buffering of packets by sending a "push" packet right after the packet pair; and avoiding the Slow Start Algorithm by priming it with a dummy packet.

16 Claims, 6 Drawing Sheets

U.S. PATENT DOCUMENTS

| | | | |
|---|---|---|---|
| 6,041,345 | A | 3/2000 | Levi et al. |
| 6,054,943 | A | 4/2000 | Lawrence |
| 6,111,567 | A | 8/2000 | Savchenko et al. |
| 6,118,817 | A | 9/2000 | Wang |
| 6,120,149 | A | 9/2000 | Hosoi |
| 6,161,201 | A | 12/2000 | Payne et al. |
| 6,195,692 | B1 | 2/2001 | Hsu |
| 6,209,041 | B1 | 3/2001 | Shaw et al. |
| 6,216,163 | B1 | 4/2001 | Bharali et al. |
| 6,262,990 | B1* | 7/2001 | Ejiri ............................ 370/412 |
| 6,272,148 | B1 | 8/2001 | Takagi et al. |
| 6,292,834 | B1 | 9/2001 | Ravi et al. |
| 6,314,492 | B1 | 11/2001 | Allen et al. |
| 6,327,421 | B1 | 12/2001 | Tiwari et al. |
| 6,329,165 | B1 | 12/2001 | Chattoraj et al. |
| 6,343,298 | B1 | 1/2002 | Savchenko et al. |
| 6,385,647 | B1 | 5/2002 | Willis et al. |
| 6,405,256 | B1 | 6/2002 | Lin et al. |
| 6,407,680 | B1 | 6/2002 | Lai et al. |
| 6,421,348 | B1* | 7/2002 | Gaudet et al. .............. 370/401 |
| 6,449,269 | B1 | 9/2002 | Edholm |
| 6,480,498 | B1* | 11/2002 | Gaudet et al. .............. 370/402 |
| 6,484,199 | B2 | 11/2002 | Eyal |
| 6,502,135 | B1* | 12/2002 | Munger et al. ............. 709/225 |
| 6,553,376 | B1 | 4/2003 | Lewis et al. |
| 6,611,868 | B1 | 8/2003 | Arutyunov |
| 6,614,763 | B1 | 9/2003 | Kikuchi et al. |
| 6,643,259 | B1* | 11/2003 | Borella et al. .............. 370/231 |
| 6,735,634 | B1 | 5/2004 | Geagan, III et al. |
| 6,757,255 | B1* | 6/2004 | Aoki et al. ................. 370/252 |
| 6,760,765 | B1 | 7/2004 | Asai et al. |
| 6,765,878 | B1* | 7/2004 | Carlson ..................... 370/252 |
| 6,772,375 | B1* | 8/2004 | Banga ......................... 714/47 |
| 6,779,043 | B1* | 8/2004 | Crinion ..................... 709/249 |
| 6,785,288 | B1 | 8/2004 | Enns et al. |
| 6,952,424 | B1* | 10/2005 | Bass et al. .................. 370/412 |
| 6,954,430 | B2* | 10/2005 | Haglund ..................... 370/232 |
| 6,990,070 | B1* | 1/2006 | Aweya et al. ............... 370/230 |
| 7,007,090 | B1 | 2/2006 | Spangler et al. |
| 2002/0047899 | A1 | 4/2002 | Son et al. |
| 2002/0048448 | A1 | 4/2002 | Daniels |
| 2002/0049817 | A1 | 4/2002 | Drory et al. |
| 2002/0090027 | A1 | 7/2002 | Karczewicz et al. |
| 2002/0170067 | A1 | 11/2002 | Norstrom et al. |
| 2003/0018799 | A1 | 1/2003 | Eyal |
| 2003/0099364 | A1 | 5/2003 | Thompson et al. |
| 2003/0236902 | A1 | 12/2003 | Weiss et al. |
| 2003/0236912 | A1 | 12/2003 | Klemets et al. |
| 2004/0003101 | A1 | 1/2004 | Roth et al. |
| 2004/0054912 | A1 | 3/2004 | Adent et al. |
| 2004/0244010 | A1 | 12/2004 | Kleyman et al. |

OTHER PUBLICATIONS

Khalil et al., "Performance considerations for TCP/IP in wide area networks", Proceedings., 19th Conference on Oct. 2-5, 1994 pp. 166-175.*

Microsoft Computer Dictionary 5th Edition, 2002 p. 498.*

Lai, Baker, "Measuring Bandwidth", INFOCOM 99. Eighteenth Annual Joing Conference of the IEEE Computer and Comunications Societies. IEEE New York, NY, Mar. 21-25, 1999, (Mar. 21, 1999) pp. 235-245.

Minshall, G et al., "Application performance pitfalls and TCP's Nagle algorithm", vol. 27, No. 4, pp. 36-44, XP002233094 Performance Evaluation REview, Mar. 2000, ACM.

W. Stevens, "TCP Slow Start, Congestion Avoidance, Fast Retransmit, and Fast Recovery Algorithms," RFC, Jan. 1997, 6 pages.

J. Nagle, "Congestion Control in IP/TCP Internetworks," RFC 896, Jan. 6, 984, 8 pages.

From the Internet: http://www.freesoft.org/CIE/Topics/83.htm, "TCP Protocol Overview," Connected: An Internet Encyclopedia, retrieved on May 31, 2000.

From the Internet: http://www.scit..wlv.ac.uk/~jphb/comms/tcp.html, "Transmission Control Protocol," retrieved on May 31, 2000.

G. Coulson, "A Distributed Object Platform Infrastructure for Multimedia Applications," Comptuer Communications, Jul. 1998, 27 pages, vol. 21, No. 9.

"Transmission Control Protocol Darpa Internet Program Protocol Specification," Information Sciences Institute University of Southern California, Sep. 1981, 82 pages.

Kamiyama N et al. "Renegotiated CBR transmission in interactive video-on-demand system", Multimedia Computing and Systems '97 Proceedings, IEEE International Conference, Ottawa ONT, Canada Jun. 3-6, 1997, pp. 12-19.

Petit G H et al. "Bandwidth resource optimization in ivdeo-on-demand network architectures", Community Networkign Integrated Multimedia Services to the Home, 1994, Proceedings of the 1st International Workshop on San Francisco, CA, Jul. 13-14, 1994, pp. 91-97.

Lixin Gao et al. "Supplying Instantaneous video-on-demand services using controlled multicast", Multimedia Computing and Systems, 1999, IEEE International Conference on Florence, Italy Jun. 7, 11, 1999, pp. 117-121.

Dutta A et al. "A Streaming architecture for next generation internet", ICC 2001, 2001 IEEE International Conference on Communications, Helsinky, Finland, Jun. 11-14, 2001, 1303-1309.

Hayes D A et al; "Impact of Flow Control on quality of service driven packet scheduling disciplines"; Control Applications, 1999. Proceedings of the 1999 IEEE International Conference on Control Applications; Kohala Coast, HI, Aug. 22, 1999; pp. 1454-1459.

Nishida Y et al; "Congestion Control Mechanism for TCP with Packet Pair Scheme"; IEICE Transactions on Information and Systems, Institute of Electronics Information and Comm. Egn. Tokyo, JP, vol. E82-D, No. 4, Apr. 1999 pp. 854-862.

"A Mathematical Theory of Communication", Shannon, C. E., The Bell System Technical Journal, vol. 27, pp. 379-423, 623-656, (pp. renumbered as 1-55), Jul. Oct. 1948.

"TAPI 3.0 Connection and Media Services", Microsoft Windows 2000 Server, Copyright 1999, 1-23.

Paknikar, Shantanu, et al. "A Caching and Streaming Framework for Multimedia," ACM Multimedia 2000, Los Angeles, CA; pp. 13-20.

Guo, Katherine, et al. "RCache: Design and Analysis of Scalable, Fault Tolerant Multimedia Stream Caching Schemes," Scalability and Traffic Control in IP Networks, Proceedings of SPIE vol. 4526, (2001); pp. 68-86.

Aboobaker, N., et al., "Streaming Media Congestion Control Using Bandwidth Estimation," Lecture Notes in Computer Science, 2002, vol. 2496, pp. 89-100.

Liefooghe, P., et al., "An Architecture for Seamless Access to Multicast Content," Proceedings of the 26th Annual IEEE Conference on Local Computer Networks, Nov. 8, 2000, pp. 488-494.

Braun, T., et al., "Multicast for Small Conferences," Proceedings of the Sixth IEEE Symposium on Computers and Communications, Jul. 3, 2001, pp. 145-150.

Fleischman, E., "WAVE and AVI Codec Registries," Network Working Group Request for Comments: 2361, The Internet Society, Jun. 1998, pp. 1-71.

Camarillo, G., et al., "Grouping of Media Lines in the Session Description Protocol (SDP)," Network Working Group Request for Comments: 3388, The Internet Society, Dec. 2002, pp. 1-21.

Handley, M., et al., "SDP: Session Description Protocol," Network Working Group Request for Comments: 2327, The Internet Society, Apr. 1998, pp. 1-42.

"Advanced Systems Format (ASF) Specification," Revision 01.20. 01e, Microsoft Corp., Sep. 2003, pp. i-vi, and 1-93.

Schulzrinne, H., et al., "RTP: A Transport Protocol for Real-Time Applications," Network Working Group Request for Comments: 3550, Jul. 2003, pp. 1-104.

Schulzrinne, H., et al., "Real Time Streaming Protocol (RTSP)," Network Working Group Request for Comments: 2326; The Internet Society (Apr. 1998), pp. 1-92.

Jin, S., et al. "Accelerating Internet Streaming Media Delivery using Network-Aware Partial Caching," 2002 IEEE, pp. 153-160.

Fielding R. et al, "Hypertext Transfer Protocol—HTTP/1.1," Network Working Group Request for Comments: 2616; The Internet Society (Jun.1999); Category: Standards Track. pp. 1-176.

Muuss, M., "The Story of the PING Program," Oct. 18, 1999, retrieved on Apr. 6, 2004 from the Internet Archive at <http://web.archive.org/web/1991018225218/ftp.arl.mil/~mike/ping.htm>, 3 pages.

Muuss, M., "The Research Interests of Mike Muuss," Oct. 8, 1999, retrieved on Apr. 6, 2004 from the Internet Archive at <http://web.archive.org/web/19991008020453/ftp.arl.mil/~/mike/>, 2 pages.

* cited by examiner

Fig. 1 (background)

*(background)*

*(background)*

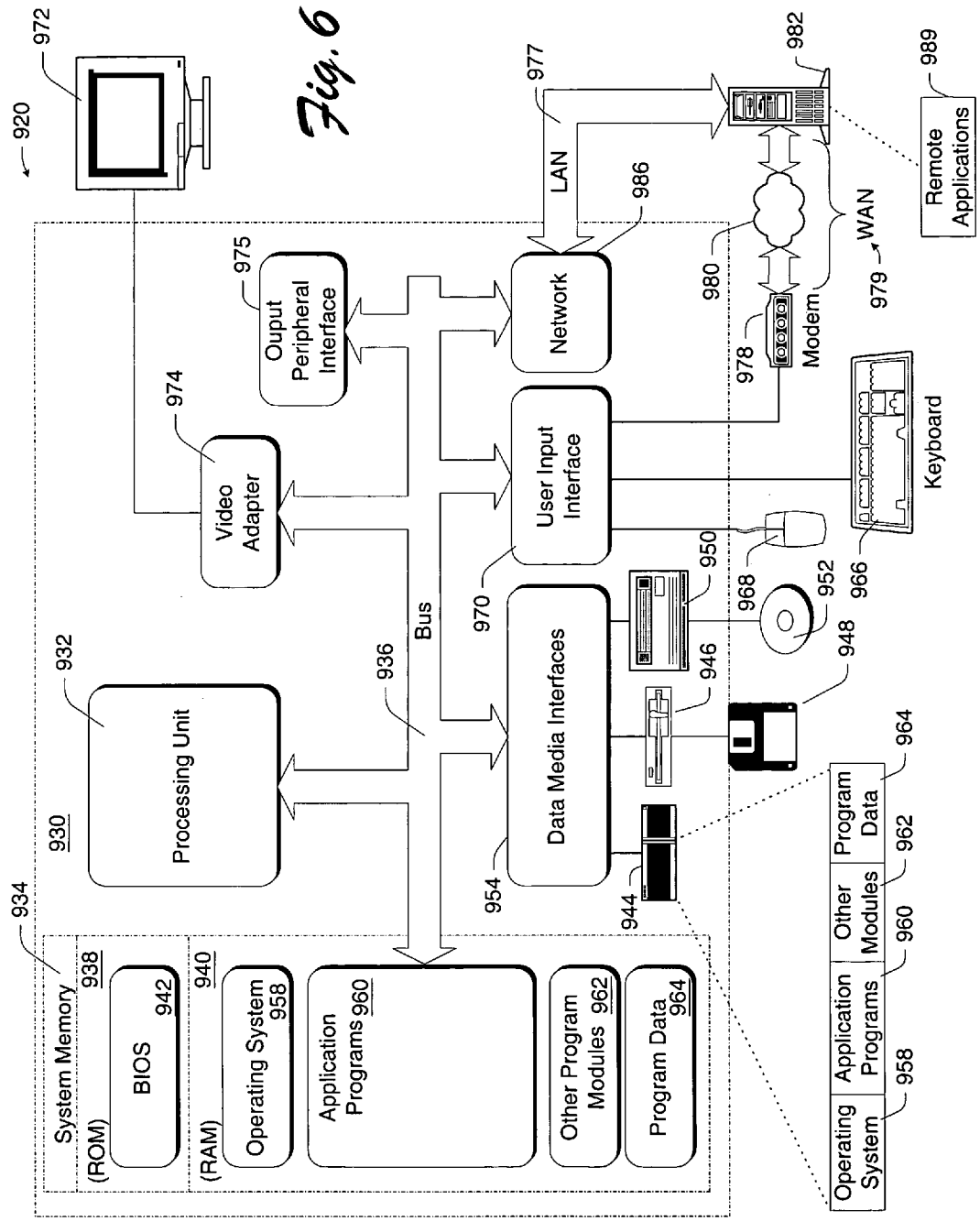

FAST DYNAMIC MEASUREMENT OF BANDWIDTH IN A TCP NETWORK ENVIRONMENT

TECHNICAL FIELD

This invention relates to dynamic detection of maximum bandwidth for a connection between entities on a TCP network environment. In particular, it relates to countermeasures to flow-control functions of the network environment that may effectively delay transmission of a set of packets.

BACKGROUND

As the Internet has matured, the characteristics of the available content on the Internet have changed. Sound and video content is now included with the traditional textual content. However, this new content on the Internet requires a greater connection speed (i.e., bandwidth) than was commonly available a few years ago.

FIG. 1 illustrates an example of a typical Internet configuration. It includes a server (such as media server 20), which is coupled to the Internet 30. The server typically includes one or more physical server computers 22 with one or more physical storage devices and/or databases 24. On the other side of an Internet transmission is a client 90, which is connected via one of many available Internet Service Providers (ISPs) 80. Herein, a server is a network entity that sends data and a client is a network entity that receives data.

Cloud 30 is labeled the Internet, but it is understood that this cloud represents that portion of the Internet that only includes that which is illustrated therein. Inside such cloud are the routers, transmission lines, connections, and other communication devices that more-often-than-not successfully transmit data between clients and servers. Inside exemplary Internet cloud 30 are routers 32-44; two satellite dishes 46 and 50; and a satellite 48. The links between these devices represent the possible paths that a data packet may take on its way between the server and the client.

In general, a communication device on a network (such as the Internet) is any device that facilitates communication over the network between two entities, and includes the two entities. Examples of such entities include the server 20 and the client 90.

The Layers of the OSI Model

Open System Interconnection (OSI) model is an ISO standard for worldwide communications that defines a networking framework for implementing protocols in seven layers. Control is passed from one layer to the next, starting at the application layer in one station, proceeding to the bottom layer, over the channel to the next station and back up the hierarchy. A person of ordinary skill in the art is familiar with the OSI model.

Most of the functionality in the OSI model exists in all communications systems, although two or three OSI layers may be incorporated into one. These layers are also called "levels."

Generally, the hardware implements the physical layer. Such hardware may include a network card, a modem, or some other communications device. Typically, the kernel of an operating system (OS) implements the transport layer.

The top of the stack is the applications in the application layer. This includes any application that communicates with entities outside of the computer, such as a Web browser, a media player, and an email program. The application layer has the least control of details of communication between entities on an network, such as the Internet.

Bandwidth

Bandwidth is the amount of data that can be transmitted in a fixed amount of time. For example, bandwidth between media server 20 in FIG. 1 to media client 90 is calculated by the amount of data (e.g., 1000 bits) that may be transmitted between them in a unit of time (e.g., one second). More specifically, data may be transmitted between devices at a rate of approximately 56,000 bits per second. That may be called 56 kilo-bits per second (Kbps).

As shown in FIG. 1, a transmission over the Internet travels across multiple links before it reaches its destination. Each link has its own bandwidth. Like a chain being only as strong as its weakest link, the maximum bandwidth between server 20 and client 90 is the link therebetween with the slowest bandwidth. Typically, that is the link between the client 90 and its ISPs 80. That slowest bandwidth is the maximum de facto bandwidth.

Herein, unless otherwise apparent from the context, references to bandwidth between network entities (such as server 20 and client 90) is assumed to be the maximum de facto bandwidth therebetween.

Bandwidth may also be called "connection speed", "speed", or "rate". In references to bandwidth measured by bits per second, it may also be called "bit rate" or "bitrate."

Streaming Media

Streaming is a technique for transferring multimedia data such that it can be processed as a steady and continuous stream. Streaming technologies are become increasingly important with the growth of the Internet because most users do not have fast enough access to download large multimedia files quickly. With streaming, the client browser or plug-in can start displaying the data before the entire file has been transmitted.

For streaming to work, the client side receiving the data must be able to collect the data and send it as a steady stream to the application that is processing the data and converting it to sound or pictures. This means that if the streaming client receives the data more quickly than required, it needs to save the excess data in a buffer. If the data doesn't come quickly enough, however, the presentation of the data will not be smooth.

Within the context of an audio and/or visual presentation, "media" and "multimedia" are used interchangeably herein. Media refers to the presentation of text, graphics, video, animation, and/or sound in an integrated way.

"Streaming media" is an audio and/or visual presentation that is transmitted over a network (such as the Internet) to an end-user. Such transmission is performed so that the presentation is relatively smooth and not jerky. Long pauses while additional frames are being downloaded to the user are annoying to the user. These annoyances encourage a user to avoid viewing future streaming media.

Smoothly Transmitting Streaming Media

Since the bandwidth determines the rate at which the client will receive data, a streaming media presentation may only be presented at a rate no greater than what the bandwidth allows. For example, assume media server 20 needs to send data at 50 Kbps to the client 90 in order to smoothly "play" a streaming media presentation. However, the bandwidth between the client and server is only 30 Kbps. The result is a jerky and jumpy media presentation.

In an effort to alleviate this problem, streaming media presentations are often encoded into multiple formats with differing degrees of qualities.

The formats with the lowest quality (e.g., small size, low resolution, small color palette) have the least amount of data to push to the client over a given time. Therefore, a client over a slow link can smoothly present the streaming media presentation, but the quality of the presentation suffers.

The formats with the highest quality (e.g., full screen size, high resolution, large color palette) have the greatest amount of data to push to the client over a given time. Therefore, the client with a fast link can smoothly present the streaming media presentation and still provide a high quality presentation.

Select-a-Bandwidth Approach

When a server sends streaming media to a client, it needs to know what format to use. Thus, in order to select the proper format, the server must to know the bandwidth between the server and the client.

This easiest way to accomplish this is to ask the user of the client what their bandwidth is. Since a client's link to the Internet is typically the bandwidth bottleneck, knowing the bandwidth of this link typically indicates the actual bandwidth.

FIG. 2 shows a cut-away 100 of a Web page displayed on a client's computer. Inside the cut-away 100, is a typical user-interface 110 that may be used to ask a user what their connection speed is. The user clicks on one of the three buttons 112, 114, and 116 provided by the user-interface 110. If the user clicks on button 112, the server delivers data from a file containing streaming media in a format designed for transmission at 28.8 Kbps. Likewise, if the user clicks on button 114, data sends from a file containing streaming media in a format designed for transmission at 56.6 Kbps. If the user clicks on button 114, the server delivers data from a file containing streaming media in a format designed for transmission at a rate greater than 56.6 Kbps and up-to the typical speed of a T1 connection.

However, the primary problem with the "select-a-bandwidth" approach is that it requires a thoughtful selection by a user. This approach invites selection errors.

It requires that a user care, understand, and have knowledge of her connection speed. Often, a user does not pay particular attention to which button to press. The user may only know that a media presentation will appear if the user presses one of these buttons. Therefore, they press any one of them.

Often, a user does not understand the concept of bandwidth. A user may choose button 116 because she may want to see the presentation at its highest quality. This user does not realize that seeing the presentation at its highest quality may result in a non-smooth presentation because her Internet connection cannot handle the rate that the data is being sent through it.

If she does understand the concept of bandwidth, then the user may not know her bandwidth. A user may simply be ignorant of her bandwidth. In addition, varying degrees of noise may cause varying connection speeds each time a user connects to the Internet. Furthermore, some types of connections (such as a cable modem) can have wide degrees of connection speed depending upon numerous factors.

Moreover, the user needs to understand the implications of an incorrect choice. A user needs to be educated so that she understands that she needs to select an option that is equal to or less than her bandwidth to get a smooth presentation. But she should not choose one that is significantly less than her bandwidth. If she does, then she will be seeing a smooth presentation at a lower quality that she could otherwise see at a higher available bandwidth.

As can be seen by the above discussion, this manual approach is often confusing and intimidating to many user. Therefore, it often results in incorrect selections.

What's more, maintaining multiple files (one for each bandwidth) at the media server adds to the overhead of maintaining a Web site.

Automatic Bandwidth Detection

To overcome these problems, media servers may use a single file containing subfiles for multiple bandwidths. In addition, media servers may automatically detect the bandwidth.

This single file is called a MBR (multiple bit rate) file. The MBR files typically include multiple differing "bands" or "streams." These bands may be called "subfiles." A user only clicks on one link. Automatically, behind the scenes, the server determines the right speed band to send to the client.

This automatic speed detection may take a long time. This means that an additional five seconds to a minute (or more) is added to the user's wait for the presentation to begin. This delay for existing automatic speed detection is because of long "handshaking" times while the speed determination is going on.

One existing automatic detection technique involves sending multiple data packets for measuring the speed between the server and client. This technique is described further below in the section titled, "Multiple Measurement Packets Technique."

Bandwidth Measurement Packets

Typically, automatic bandwidth detection techniques measure bandwidth between entities on a network by sending one or more packets of a known size.

FIG. 3 shows a time graph tracking the transmission of two such packets ($P_x$ and $P_y$) between a sender (e.g., server) and a receiver (e.g., client). The server and client sides are labeled so. On the graphic, time advanced downwardly.

Time $t_a$ indicates the time at the server the transmission of $P_x$ begins. Time $t_b$ indicates the time at the server the transmission of $P_x$ ends. Similarly, Time $t_0$ indicates the time at the client begins receiving $P_x$. Time $t_1$ indicates the time at the client completes reception of $P_x$. At $t_1$, the network hardware presumably passes the packet up the communication layers to the application layer.

Packet $P_y$ is similarly labeled on the time graph of FIG. 3. $t_c$ is the server time at the transmission of $P_y$ begins. $t_d$ is the server time that the transmission of $P_y$ ends. Similarly, $t_2$ is the client time that it begins receiving $P_y$. $t_3$ is the client time that it completes reception of $P_y$. At $t_3$, the network hardware presumably passes the packet up the communication layers to the application layer.

Bandwidth measurement using a single packet. In a controlled, laboratory-like environment, measuring bandwidth between two entities on a network is straightforward. To make such a calculation, send a packet of a known size from one entity to the other and measure the transmission latency, which is the amount of time it takes a packet to travel from source to destination. Given this scenario, one must know the time that the packet was sent and the time that the packet arrived.

This technique is nearly completely impractical outside of the laboratory setting. It cannot be used in an asynchronous network (like the Internet) because it requires synchronization between the client and server. Both must be using the same clock.

Alternatively, the client may track the time it begins receiving a packet (such as $t_0$ for $P_x$) and the time the packet is completely received (such as $t_1$ for $P_x$).

FIG. 3 shows packet $P_x$ being sent from a server to a client. $P_x$ has a known size in bits of PS. The formula for calculating bandwidth (bw) is $$bw(P_x) = \frac{PS}{t_1 - t_0} \qquad \text{Formula 1 (Single Packet)}$$

This technique works in theory, but unfortunately does not work in practice. Only the hardware knows when a packet is initially received. Therefore, only the hardware knows when $t_0$ is.

The other communication layers (such as the transport layer and the application layer) can only discover the time when the packet is completely received by the hardware. That is when the hardware passes it up to them. This completion time for packet $P_x$ is $t_1$. It is not possible to calculate bandwidth only one knowing one point in time.

Packet-pair. A technique called packet-pair is used to overcome these problems in asynchronous networks. With packet-pair, two identical packets are sent back-to-back. The server sends a pair of packets, one immediately after the other. Both packets are identical; thus, they have the same size (PS). The bandwidth is determined by dividing the packet size by the time difference in reception of each packet.

Each packet has specific measurable characteristics. In particular, these characteristics include its packet size (PS) and the measured time such a packet arrives (e.g., $t_{0-3}$ in FIG. 3). Some characteristics (such as packet size) may be specific rather than measured, but they may be measured if so desired.

As shown in FIG. 3, the server sends packet, $P_x$. The client's hardware begins receiving the packet at $t_0$. When reception of the packet is complete at $t_1$, the hardware passes it up the communication layers. Ultimately, it is received by the destination layer (e.g., application layer) at presumably $t_1$.

After the server sends $P_x$ (which completed at $t_b$), it immediately sends packet $P_y$ at $t_c$. It is important that there be either 1) absolutely no measurable delay between $t_b$ and $t_c$ or 2) a delay of a known length between $t_b$ and $t_c$. Herein, to simplify the description, it will be assumed that there is no measurable delay between $t_b$ and $t_c$.

The client's hardware begins receiving $P_y$ at $t_2$. When reception of the packet is complete at $t_3$, the hardware passes it up the communication layers. Ultimately, it is received by the destination layer (e.g., application layer) at presumably $t_3$.

FIG. 3 shows no delay between $t_1$ (the time of completion of reception of $P_x$) and $t_2$ (the time reception of $P_y$ begins). Theoretically, this will always be the case if $P_x$ and $P_y$ are transmitted under identical conditions. In practice, is the often the case because $P_y$ is sent immediately after $P_x$.

Using packet-pair, the formula for calculating bandwidth (bw) is $$bw(P_x P_y) = \frac{PS}{t_3 - t_1} \qquad \text{Formula 2 (Packet - Pair)}$$

This technique works in theory and in practice. However, it only works well over a network that is relatively static.

For example, in FIG. 1, assume the network consists of only the server 20; routers 32, 34, and 36; a specific ISP of ISPs 80; and client 90. Further, assume that the links between each node on this static network is fixed and has a consistent bandwidth. In this situation, the packet-pair techniques provide an accurate and effective measurement of bandwidth.

Issues related to using Packet-pair over the Internet. However, the packet-pair technique does not work well over a dynamic network, like the Internet. A dynamic network is one where there is a possibility that a packet may be handled in a manner different from an earlier packet or different from a later packet. In particular, there are problems with a TCP network.

FIG. 1 illustrates examples of handling differences found on a dynamic network. Assume that all packets are traveling from the server to the client (from left to right in FIG. 1). Assume that packets 60-68 were sent back-to-back by the server 20 to the client 90.

Notice, as illustrated in FIG. 1, that packets may take different routes. In addition, some routes may significantly delay the packet transmission. This is especially true if the packet is transmitted via an apparently unusual (but not necessarily uncommon) route, such as wireless transmission, oversees via an underwater cable, satellite transmission (as shown by dishes 46 and 50 and satellite 48), etc. A router (such as router 42) may delay one or more packets (such as 63 and 64) more than another may be temporarily storing them in a memory (such as buffer 43).

Multiple Measurement Packets Technique

To overcome these problems, conventional automatic bandwidth measurement techniques uses multiple packets. A server sends several (much more than two) packets and calculates the speed of each. Conventional wisdom on bandwidth measurement indicates that in order to get accurate measurements several pairs of packets must be sent repeatedly over several seconds to several minutes. Herein, this technique is called "multiple-packets" to distinguish it from the above-described "packet-pair" technique.

Typically, the ultimate bandwidth is determined by finding the average of the many bandwidth measurements. This averaging smoothes out variances in delays for each packet; however, it does not compensate for packet compression during transmission. One of two extremely incorrect measurements will skew the average.

Unfortunately, this technique takes a long time relative the existing wait for the user between click and media presentation. A long time may be five seconds to several minutes depending on the data and the situation. Such a delay adds to the annoyance factor for the user who wishes experience the media presentation. This is not an acceptable delay. Since there are not other options available using conventional techniques, the user has be forced to endure these delays.

No existing automatic bandwidth measurement can nearly instantaneously measure bandwidth across the Internet using a pair of packets. No existing automatic bandwidth measurement can make such measurements at the application layer. Thus, it avoids modifying the operating system. No existing automatic bandwidth measurement addresses measurement distortion caused by packet compression.

Transport Layer Implementation

The conventional approaches typically modify the kernel of the operating system (OS) to do perform automatic bandwidth measurements. More specifically, these approaches modify the transport layer of the OSI model and such layer is often located within the kernel of the OS. In general, such modifications are undesirable, because it is generally less stable and more expensive then implementations that do not modify the OS.

If these approaches could be implemented within an application (thus, at the application layer), such modifications would not be possible. However, no existing packet-pair approach measures bandwidth at the application layer. This is because the application layer has less control over the details of the actual communication over the network. In particular, an application has even less control using TCP, that it would with UDP (User Datagram Protocol).

TCP and UDP are discussed below in section titled "TCP and UDP." The transport and application layers are part of the seven layers of the OSI model discussed below.

TCP and UDP

Over the Internet (and other networks), packets of data are usually sent via TCP or UDP protocols. TCP is the universally accepted and understood across the Internet.

TCP (Transmission Control Protocol) is one of the main protocols in TCP/IP networks (such as the Internet). Whereas the IP protocol deals only with packets, TCP enables two hosts to establish a connection and exchange streams of data. TCP guarantees delivery of data and guarantees that packets will be delivered in the same order in which they were sent.

UDP (User Datagram Protocol) is a connectionless protocol that (like TCP) runs on top of IP networks. Unlike TCP/IP, UDP/IP provides very few error recovery services, offering instead a direct way to send and receive packets (i.e., datagram) over an IP network.

A packet is a chuck of data provided by the application program. UDP typically sends a single "application-level packet" as a single UDP packet. However, TCP may break a single application-level packet into multiple smaller TCP "segments", each of which is treated as a separate "packet" at the TCP layer. The Nagle Algorithm (discussed below) does the opposite: It takes multiple small application packets and combines them into a single larger TCP segment.

Nagle TCP/IP Algorithm

The Nagle Algorithm was designed to avoid problems with small TCP segments (sometimes called "tinygrams") on slow networks. The algorithm says that a TCP/IP connection can have only one outstanding tinygram that has not yet been acknowledged. The defined size of a tinygram depends upon the implementation. However, it is generally a size smaller than the size of typical TCP segments.

The Nagle Algorithm states that under some circumstances, there will be a waiting period of about 200 milliseconds (msec) before data is sent. The Nagle Algorithm uses the following parameters for traffic over a switch:

Segment size=MTU or tcp_mssdflt or MTU path discovery value.
TCP Window size=smaller of tcp_sendspace and tcp_recvspace values.
Data size=application data buffer size.

The following are the specific rules used by the Nagle Algorithm in deciding when to send data:

If a packet is equal to or larger than the segment size (or MTU), and the TCP window is not full, send an MTU size buffer immediately.
If the interface is idle, or the TCP_NODELAY flag is set, and the TCP window is not full, send the buffer immediately.
If there is less than half of the TCP window in outstanding data, send the buffer immediately.
If sending less than a segment size buffer, and if more than half the window is outstanding, and TCP_NODELAY is not set, wait up to 200 msec for more data before sending the buffer.

Setting TCP_NODELAY on the socket of the sending side deactivates the Nagle Algorithm. All data sent will go immediately, no matter what the data size.

The Nagle Algorithm may be generically called the "tinygram-buffering" function because its buffers tinygrams.

TCP Slow Start Algorithm

On TCP networks that don't use "slow start," devices start a connection with a sender by injecting multiple packets into the network, up to the window size advertised by a receiver. While this is acceptable when the two hosts are on the same LAN (local area network), problems may arise if there are routers and slower links between the sender and the receiver. Since some of the intermediate router is likely to queue the packets, it is possible for that such a router will have insufficient memory to queue them. Therefore, this naive approach is likely to reduce the throughput of a TCP connection drastically.

The algorithm to avoid this is called "slow start." It operates by observing that the rate at which new packets should be injected into the network is the rate at which the acknowledgments are returned by the other end.

The Slow Start Algorithm adds another window to the sender's TCP: a congestion window, called "cwnd". When a new connection is established with a host on another network, the congestion window is initialized to one packet. Each time an acknowledgement (i.e., "ACK") is received, the congestion window is increased by one packet. The sender can transmit up to the minimum of the "congestion window" and the "advertised window." The "congestion window" is flow control imposed by the sender. The "advertised window" is flow control imposed by the receiver. The former is based on the sender's assessment of perceived network congestion. The latter is related to the amount of available buffer space at the receiver for this connection.

The sender starts by transmitting one packet and waiting for its ACK (acknowledgement). When that ACK is received, the congestion window is incremented from one to two. Now, two packets can be sent. When each of those two packets is acknowledged, the congestion window is increased to four. And so forth.

At some point, the capacity of the connection between the sender and receiver may be reached. At that point, some intermediate router will start discarding packets. This tells the sender that its congestion window has reached its limit.

Proxy

A proxy (i.e., proxy server) is a device that sits between a client application (such as a Web browser) and a real server. Generally, it intercepts all requests to and from the real server to see if it can fulfill the request itself. If not, it forwards the request to the real server. A proxy is employed for two main purposes: Improve performance and filter requests.

Since the proxy server is often a central point of communication for a number of clients, it attempts to make its communications as efficient as possible. Thus, it typically implements a form of the Nagle Algorithm. Every new TCP connection start with Slow Start. When there is a proxy between the client and the server, slow start is run in the two connections: server-proxy and proxy-client. Therefore, the proxy adds new complexity to the packet pair experiment.

Background Summary

An application (at the application layer) has limited control over the handling of TCP packets. Thus, conventional bandwidth measurements avoid application-level TCP bandwidth measurements.

The integrity of the packet pair technique requires that at least two packets be sent back-to-back. However, these packets may not arrive in such a manner because of the affects of the Nagle Algorithm and the Slow Start Algorithm. This discourages the use of the packet-pair technique for bandwidth over a TCP network.

SUMMARY

The fast dynamic measurement of bandwidth in a TCP network environment utilizes a single pair of packets to calculate bandwidth between two entities on a network (such as the Internet). This calculation is based upon the packet-pair technique. This bandwidth measurement is extremely quick.

On its journey across a network, communication devices may delay the packet pairs. In particular, TCP networks have two algorithms designed to delay some packets with the goal of increasing the overall throughput of the network. However, these algorithms effectively delay a packet pair designed to measure bandwidth. Therefore, they distort the measurement. These algorithms are "Nagle" and "Slow Start."

The fast dynamic measurement of bandwidth implements countermeasures to overcome the delays imposed by these algorithms. Such countermeasures include disabling the application of the Nagle Algorithm; minimizing the buffering of packets by sending a "push" packet right after the packet pair; and avoiding the Slow Start Algorithm by priming it with a dummy packet.

BRIEF DESCRIPTION OF THE DRAWINGS

FIG. 6 is an example of a computing operating environment capable of implementing the exemplary bandwidth meter.

DETAILED DESCRIPTION

The following description sets forth a specific embodiment of the fast dynamic measurement of bandwidth in a TCP network environment that incorporates elements recited in the appended claims. This embodiment is described with specificity in order to meet statutory written description, enablement, and best-mode requirements. However, the description itself is not intended to limit the scope of this patent. Rather, the inventors have contemplated that the claimed fast dynamic measurement of bandwidth in a TCP network environment might also be embodied in other ways, in conjunction with other present or future technologies.

Even when used with a TCP network (such as the Internet), an exemplary fast dynamic measurement of bandwidth in a TCP network environment (i.e., "bandwidth meter" or "bw-meter") described herein is fast and robust. The exemplary bandwidth meter implements a low-latency technique for automatically measuring the network bandwidth available between two entities on a communications network. It has been found to be particularly useful over the Internet (or other such TCP networks).

Unlike the conventional approaches, the exemplary bw-meter obtains a best effort bandwidth measurement with the least possible delay, even under difficult network conditions. The exemplary bw-meter is designed to provide reasonable output in less than one second in most existing TCP networks, including LANs, cable, DSL, and modem connections.

Furthermore, the exemplary bw-meter is implemented at the application layer. Although the exemplary bw-meter may be implemented on other layers, the one described herein is implemented on the application layer. In particular, it may be partially implemented by a Web browser or a media player.

Other aspects of the packet-pair technique that may be implemented by the exemplary bw-meter are described in more detail in co-pending U.S. patent application entitled "Fast Dynamic Measurement of Connection Bandwidth" with Ser. No. 09/636,004, which was filed Aug. 9, 2000 and is assigned to the Microsoft Corporation. The co-pending application is incorporated herein by reference.

Packet-Pair Technique

Figure 3:
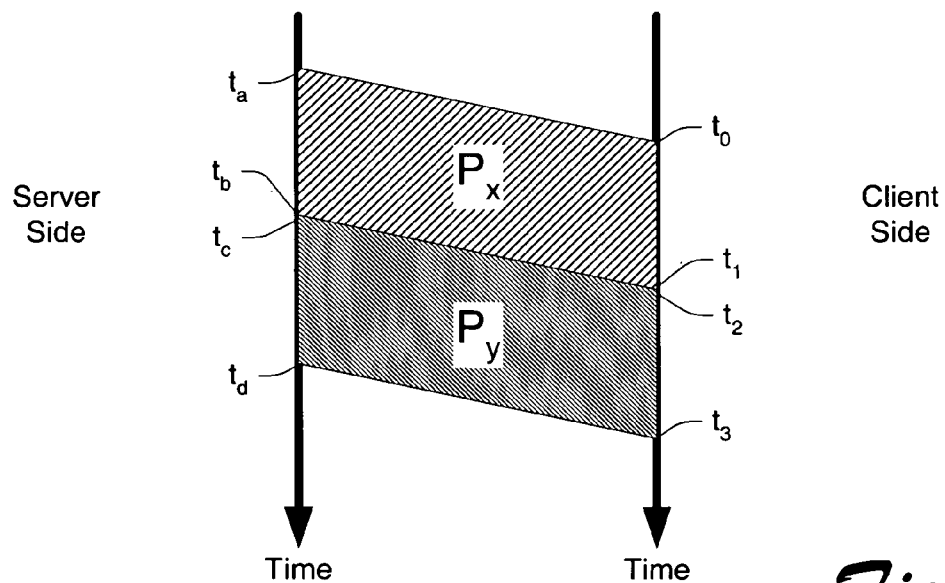
FIG. 3 shows a packet pair (being sent from a server to a client) graphed in the time domain. This shows a conventional implementation of packet-pair technique to measure bandwidth.

The exemplary bw-meter utilizes the well-established packet-pair technique described above and illustrated in FIG. 3. The exemplary bw-meter uses the packet-pair formula (Formula 2) described above to calculate the maximum de facto bandwidth between two entities on a communications network (such as the Internet).

Unlike existing automatic bandwidth measurement techniques that use multiple packets, the exemplary bw-meter uses a single pair of packets for measuring bandwidth over the Internet. With the exemplary bw-meter, bandwidth measurements and calculations are made "nearly instantaneously" because only a single pair of measurement packets is sent. The term "nearly instantaneously" means that the bandwidth is determined as soon as the pair of packets arrive at the client.

The exemplary bw-meter overcomes the drawbacks and limitations of using packet-pairs over a TCP network (such as the Internet) by implementing countermeasures to the Nagle Algorithm and the Slow Start Algorithm.

Figure 1:
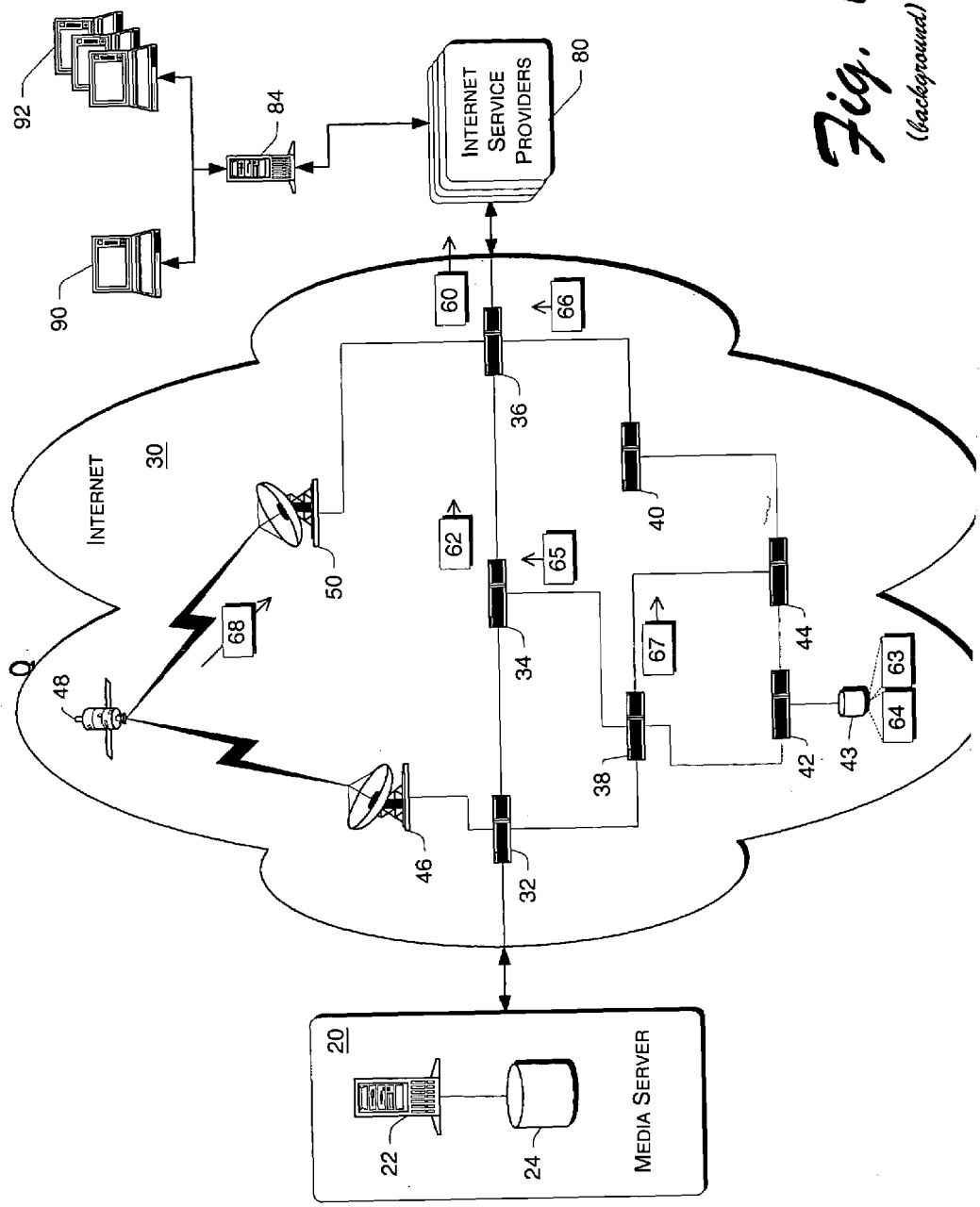
FIG. 1 illustrates a typical public networking environment (such as the Internet) and the routing of and delay of data packets sent from a server to a client.
Figure 2:
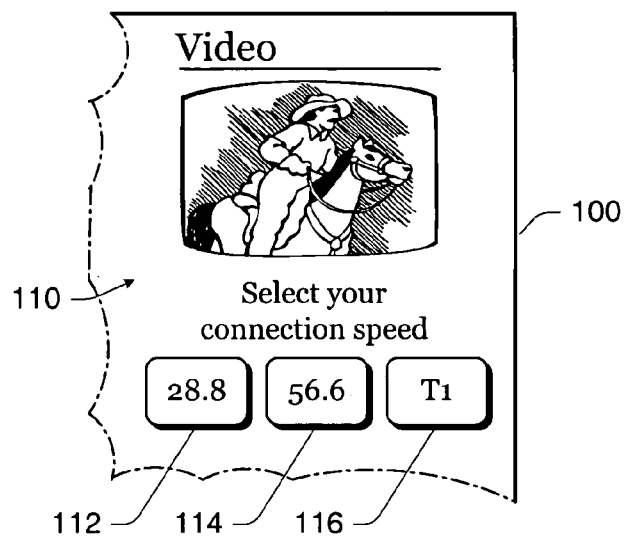
FIG. 2 is cut-away portion of a Web page. The cut-away shows a user interface providing a user a mechanism for selecting the bandwidth. This shows a conventional technique for determining bandwidth.
Figure 4:
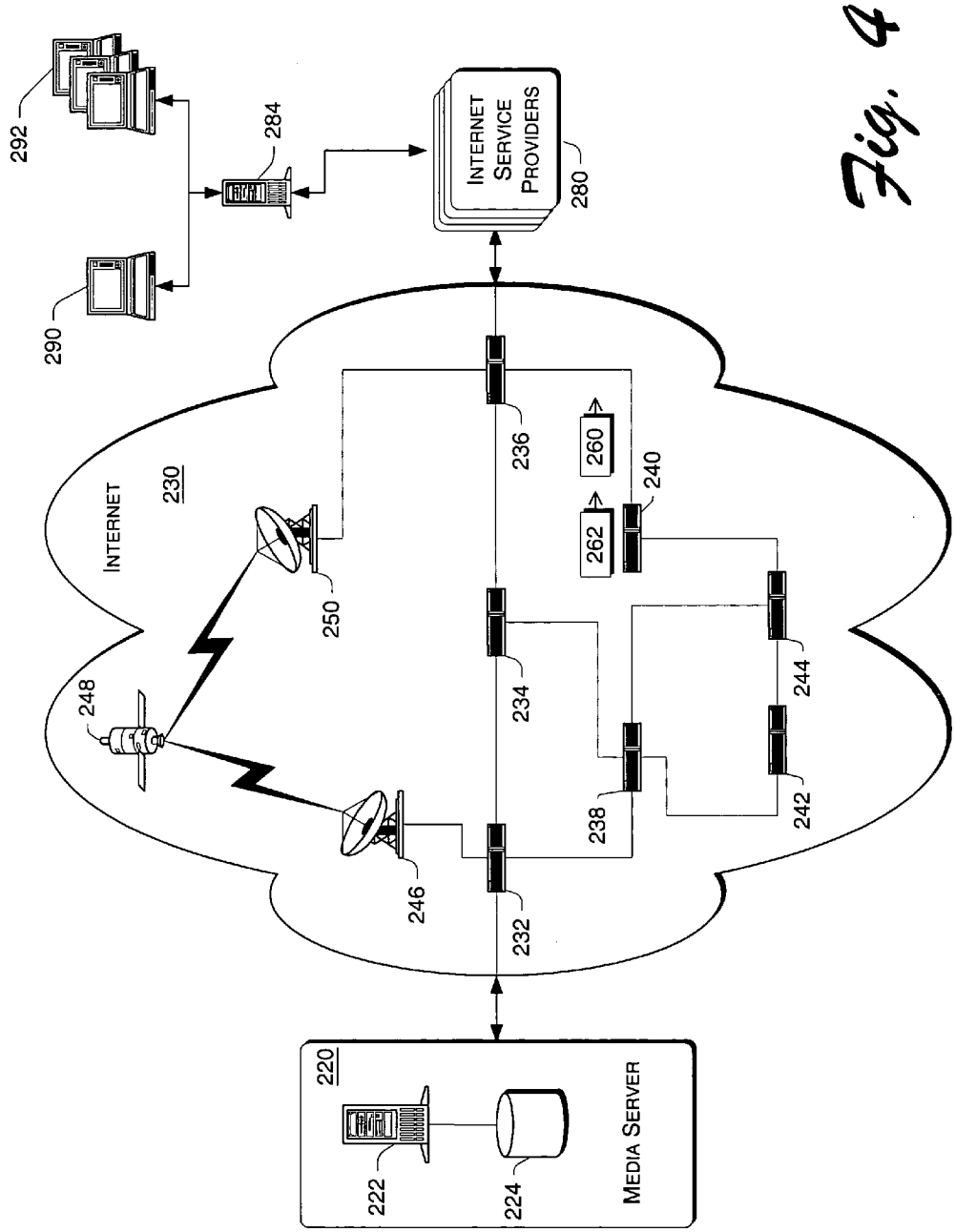
FIG. 4 also illustrates a typical public networking environment (such as the Internet). This shows a pair of packets sent back to back.

Packet Pair Journey. A packet of the packet-pair technique of the exemplary bw-meter travels from the sending entity (e.g., server) to the receiving entity (e.g., client). FIG. 4 shows an example of such a journey. FIG. 4 illustrates an environment similar to that shown in FIG. 1.

FIG. 4 illustrates an example of a typical Internet (TCP network) configuration. It includes a server (such as media server 220), which is coupled to the Internet 230. The server typically includes one or more physical server computers 222 with one or more physical storage devices and/or databases 224. On the other side of an Internet transmission is a client 290, which is connected via a proxy server 284, which is Internet Service Providers (ISPs) 280.

Cloud 230 is labeled the Internet, but it is understood that this cloud represents that portion of the Internet that only includes that which is illustrated therein. Inside such cloud are the routers, transmission lines, connections, and other devices that more-often-than-not successfully transmit data between clients and servers. Inside exemplary Internet cloud 230 are routers 232-244; two satellite dishes 246 and 250; and a satellite 248. These represent the possible paths that a data packet may take on its way between the server and the client.

FIG. 4 shows successive packets 260 and 262 of the pair sent in accordance with the exemplary bw-meter. The server 220 sends packet 262 immediately after packet 260.

The proxy server 284 is connected via link 282 to its ISPs 280. Client 290 and clients 292 use the proxy server to communicate with the Internet.

Application-Level Bandwidth Measurement

Conventional bandwidth measurement approaches are typically implemented the transport layer or some other layer below the application level. However, the exemplary bw-meter is implemented at the application layer. There are at least two major benefits to such an application-level approach to TCP packet-pair bandwidth measurement.

First, a lower level (such as transport level) packet-pair implementation is disfavored. It requires changes to the kernel of the OS and it does not lend itself easily to incremental deployment. As opposed to an application-level implementation, a lower packet-pair implementation involves greater expense in development, initial deployment, future development, and future deployment.

Second, according to one study, only a quarter of the TCP connections studied would benefit from a bandwidth measurement. Therefore, it is not cost effective to implement such bandwidth measurement at a lower level if it only used no more than a quarter of the connections. Therefore, such bandwidth measurement is best to be included in the applications that applications that need it. Applications are much easier (and less expensive) to incrementally deploy than a new kernel of the operating system.

It is generally safe to assume that the receiver's clock is sufficiently precise and the IP datagrams (i.e., packets) are passed up through the receiver's network stack (OSI layers) to the application unmolested. The second assumption is violated in the case of some applications, such as software from America Online version four (AOLv4) and earlier which behaved as if it only delivered data to the application on a timer. Thus, this imposed an artificial clock granularity on the measurements. Fortunately, it appears that version five (and later) of AOL software do not perform such molestation.

Conditions for Effective Measurements Using Packet-Pair

When using the packet-pair technique to measure bandwidth, two conditions must be met to achieve a good measurement.

The first condition is that the packets must be sent back-to-back. Herein, this is called the "back-to-back" condition. If packets are not back-to-back, then the timing measurements between them will be distorted. Both the Nagle Algorithm and the Slow Start Algorithm threaten this condition. Both potentially delay delivery of the second measurement packet. For bandwidth measurement using a packet-pair, any avoidable delay between packets is intolerable because it distorts the measurement of the actual bandwidth.

The second condition is that the size of the packets must be preserved. That is, they must not be combined with other packets. Herein, this is called the "size-preservation" condition. The Nagle Algorithm threatens this condition.

The Nagle algorithm may cause multiple application-layer packets to be sent as a single TCP segment. Thus, while the application may think it is sending two or more packets, in fact, the TCP layer is only sending a single packet.

Countermeasures to the Nagle Algorithm

An interesting behavior of the Nagle Algorithm is that for small packets, only one ACK may be outstanding. Thus, a pair of small packets cannot be sent back-to-back with the Nagle Algorithm. The Nagle Algorithm will combine small packets that are waiting for an ACK. This affects both the "back-to-back" and the "size-preservation" conditions.

The exemplary bw-meter puts a countermeasure into action to overcome the Nagle Algorithm's tendency to interfere with the two conditions. An entity (such as the server 220 in FIG. 4) sends a command that instructs communication devices (such as routers 230-250) to disable the Nagle Algorithm. Generally, the server passes a command generically called a "delay-disable" command. Specifically, the server passes TCP_NODELAY to SetSockOpt( ).

As long as the congestion window is open, turning off the Nagle Algorithm prevents TCP from attempting to combine any of the packet-pair packets and TCP will immediately write the packet to the network.

In other words, with the Nagle Algorithm disabled by a "delay-disable" command, both packets of the packet-pair will flow though routers without the delay caused by Nagle's collecting of multiple packets.

Countermeasure to the Slow Start Algorithm

The exemplary bw-meter puts a countermeasure into action to overcome the Slow Start Algorithm's tendency to interfere with the "back-to-back" condition. This is done by opening the server's congestion window (which is specifically called "cwnd") to at least three packets.

This is done by "priming" the congestion window. To prime the congestion window, a server sends at least one packet and receives an ACK before its sends the pair of packets and the packet-pair. Therefore, the server sends at least one "priming" packet to the client and that packet is not used for calculating bandwidth. After one or more priming packets are sent, the server sends the actual packet-pair used for measuring bandwidth. At this point, the Slow Start Algorithm will let, at least, two packets in a row go through without delaying them.

The Slow Start Algorithm can be completely avoided by performing the bandwidth measurement later in the particular TCP connection. However, this is not a desirable option because of two reasons: additional delay and overhead causing a faulty measurement.

If the measurement is made later, there is a built-in delay to wait for the Slow Start Algorithm to run its course. It is better to not have any delays that can be avoided. With the exemplary bw-meter, this delay can be avoided.

Performing the bandwidth measurement at the beginning of a TCP connection removes many uncertainties that accumulate as the connection progresses. For example, if the TCP connection is shared by both control and data transport, it is impossible to predict later in the session whether the sender's congestion window will allow packets to be sent back-to-back.

Countermeasures to Delays at a Proxy

The Nagle Algorithm operating at a proxy can similarly distort a packet-pair bandwidth measurement. Generally, proxies do not recognize a "delay-disable" command. Neither the client nor the server application can tell in advance if the connection is made through a circuit-level proxy.

In order to address the Nagle Algorithm at a proxy, a large third packet is sent after the pair of measurement packets. If the proxy is holding the second packet of the packet-pair, the third packet pushes it along. Hence, this third packet is called the "push" packet.

In addition, the first and second packets could be combined at the proxy. The result would be an artificially high measurement, but the overwhelming majority of proxy users have a high bandwidth connection anyway.

Methodological Implementation

Figure 5:
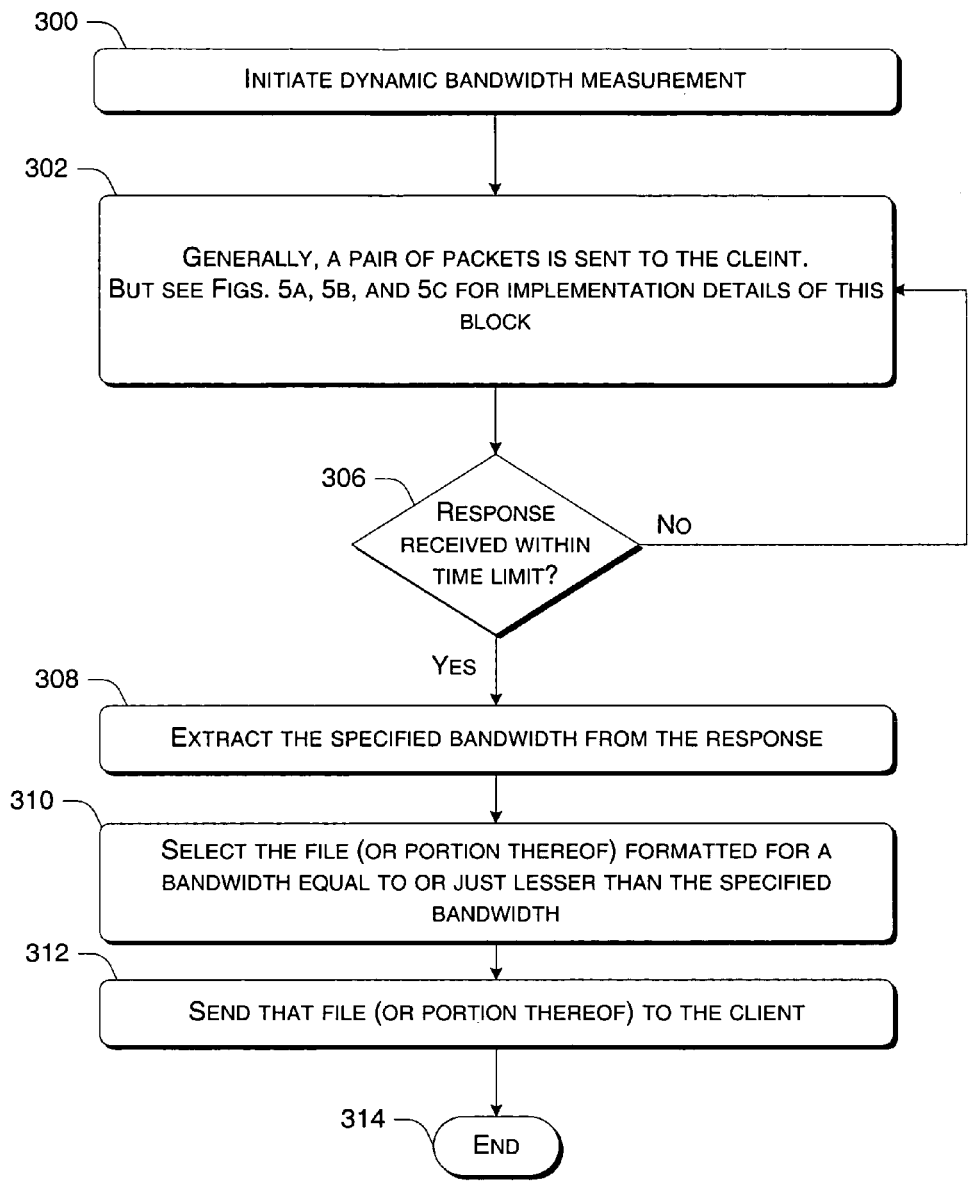
FIG. 5 is a flowchart illustrating the methodology of an implementation of the exemplary bandwidth meter.

FIG. 5 shows a methodological implementation of the exemplary bandwidth meter. It is from the server perspective. At 300, the dynamic bandwidth measurement in accordance with the exemplary bandwidth meter is initiated. Typically, a user of the bandwidth selects an option on a Web page to experience a media presentation. Alternatively, an application on the client may initiate such bandwidth measurement. Such an application may be a Web browser, media player, or the like.

Figure 5A:
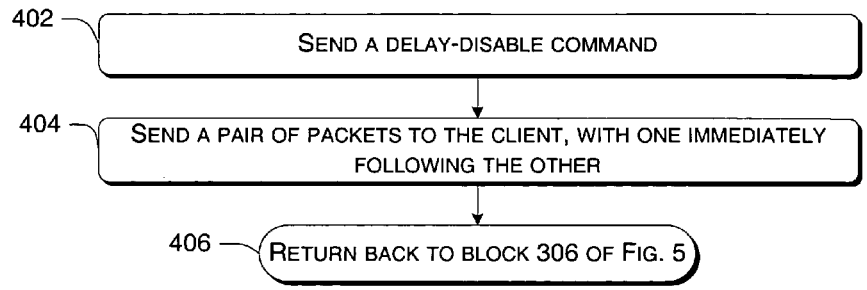
FIGS. 5a, 5b, and 5c are a flowchart illustrating the specific methodology implementation details of different aspects of the exemplary bandwidth meter.
Figure 5B:
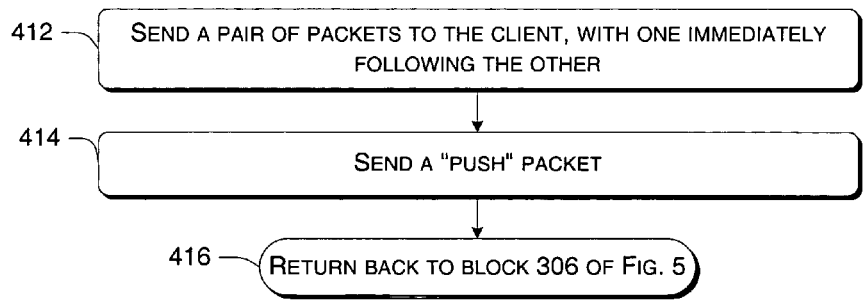
Figure 5C:
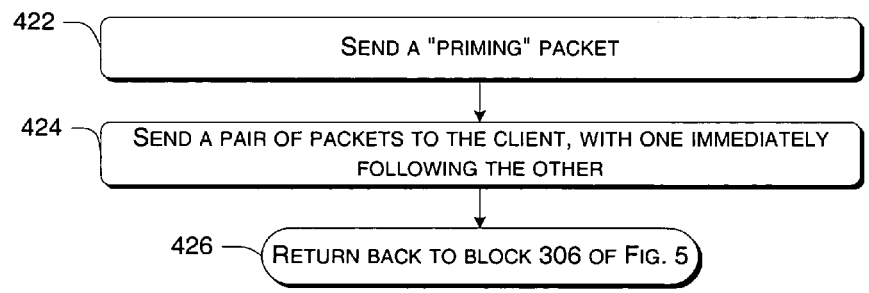

Generally, at 302 of FIG. 5, the server sends a pair of packets to the client, with one immediately following the other. The specific implementation details at this block 302 are shown in FIGS. 5a, 5b, and 5c. These figures are discussed below.

At 306, the server waits for a response from the client. If it is not received within time limit, the process returns to send another pair of packets at 302. Although not shown in the flowchart, the process will repeat this a given number of times before terminating and generating an error. If a response is received within the time limit, the process proceeds to the next block at 308.

The response includes a bandwidth measurement determined by the client using the pair of packets sent by the server at 304. The server extracts the specified bandwidth from the response at 308.

At 310 of FIG. 6, the server selects the file (or portion thereof) formatted for a bandwidth equal to or just lesser than the specified bandwidth. At 312, the server sends the file (or portion thereof) to the client.

If it was a media file, the user of the client enjoys a media presentation that begins play quickly. It also plays smoothly and at the highest quality possible at a measured bandwidth. The process ends at 314.

Countermeasure to Nagle Algorithm. FIG. 5a shows the specific methodological implementation of the exemplary bandwidth meter for the countermeasure to the Nagle Algorithm. At 402, the server sends a delay-disable command to disable the use of the Nagle Algorithm. At 404, the server sends a pair of bandwidth-measurement packets to the client. At 406, the process returns to block 306 of FIG. 5.

Countermeasure to Proxy Delays. FIG. 5b shows the specific methodological implementation of the exemplary bandwidth meter for the countermeasure to the Proxy delays. At 412, the server sends a pair of bandwidth-measurement packets to the client. At 414, the server sends a "push" packet to force the pair out of any buffer in which they may be stored by a communications device. At 416, the process returns to block 306 of FIG. 5.

Countermeasure to Slow Start Algorithm. FIG. 5c shows the specific methodological implementation of the exemplary bandwidth meter for the countermeasure to the Slow Start Algorithm. At 422, the server sends a "priming" packet to overcome the Slow Start Algorithm.

This "priming" packet is not used for bandwidth measurement. It allows the network to open up (i.e., the congestion window to open) and allow two packets at a time without delay. At 424, the server sends a pair of bandwidth-measurement packets to the client. At 426, the process returns to block 306 of FIG. 5.

OTHER IMPLEMENTATION DETAILS

Implementation Applications. The exemplary bw-meter may be implemented by any entity wishing to quickly measure bandwidth between two entities on a network. In particular, a TCP network, such as the Internet.

Such an entity may implement this exemplary bw-meter at the application level. Examples of an application-level program modules that may implement this exemplary bw-meter is streaming media server application on a server using either Microsoft Media Server (MMS) protocol or Real Time Streaming Protocol (RTSP).

Both MMS and RTSP share the very similar fundamental techniques to provide the conditions for a successful measurement using the exemplary bw-meter. However, implementation of the exemplary bw-meter using RTSP is trickier than such an implementation using MMS protocol.

RTSP Packet Pair Syntax. One way that RTSP is trickier than MMS is because the three packets must masquerade as a response to an RTSP command so the client's RTSP parser may process them. The RTSP GET_PARAMETER command is used to request the packet pair experiment. The first packet of the reply begins with the typical RTSP response headers.

Here are examples of the headers for a packet-pair request from the client:
GET_PARAMETER*RTSP/1.0
Content-Type: application/x-rtsp-packetpair
Content-Length: 16
Date: Sun, 02 Apr 2000 22:36:18 GMT
CSeq: 2
User-Agent: WMPlayer/5.0.0.0488 guid/1A21De80-08E7-11D4-93FE-006097B76A2E
Accept-Language: en-us, *;q=0.1
Accept-Charset: UTF-8, *;q=0.1
Timestamp: 1

Here are examples of the headers for the packet pair reply from the server:
RTSP/1.0 200 OK
Content-Type: application/x-rtsp-packetpair
Content-Length: 2048
Date: Sun, 02 Apr 2000 22:30:48 GMT
CSeq: 2
TimeStamp: 1 0.063
Server: WMServer/5.0.0.0518

TCP issues. As noted earlier, the congestion window needs to be open to at least three packets by the time the three packets are sent from the server. Since the initial congestion window is two, the DESCRIBE response is used to open the window to three or greater. If the DESCRIBE response requires three packets, that means that the third packet must wait for an ACK from the client before it can be transmitted.

While the server's TCP is waiting for the ACK of either or both of the first two packets, if the GET_PARAMETER arrives and then the application starts writing the reply to the GET_PARAMETER to the socket, the packet pair packets may be combined with the third and last packet of the DESCRIBE reply and with one another. Therefore, the client should not send the GET_PARAMETER until the DESCRIBE reply is fully received.

This guarantees that the congestion window will be open at the server when the packet pair packets are sent. Consequently, no packets will be combined. The DESCRIBE response may be one or greater packets and the congestion window will be three or greater when the packet pair is performed. Obviously, no other traffic should occur before the packet pair.

Measuring Arrival Times. Part of performing the packet pair measurement of the exemplary bw-meter (at the application level) means that the client application is measuring the arrival times of the two packets. RTSP presents an extra challenge in that the response headers take a relatively long time to process compared to the granularity needed for an accurate measurement. Therefore, the client cannot wait until processing the response header to figure out that it is a response to a packet pair request before it time stamps this first packet of the packet pair.

The timestamp must occur before the client even knows what kind of response it is. Therefore, when the client makes a packet pair request, it timestamps every incoming command response packet until it receives the packet pair. Then it quits this pre-timestamp mode.

The client must still process the header of the first packet before it can read the second packet. Therefore, there is an upper bound to how high of a bottleneck can be measured and it is determined by how fast the client can process the RTSP response header. For instance, if the time it takes to process the header is 5 ms, the maximum speed that can be measured is around 800 kb/s. Therefore, RTSP measurements at the high end will not be as good as MMS unless the time it takes to parse the RTSP response is low.

Exemplary Computing Environment

FIG. 6 illustrates an example of a suitable computing environment 920 on which the exemplary bw-meter may be implemented.

Exemplary computing environment 920 is only one example of a suitable computing environment and is not intended to suggest any limitation as to the scope of use or functionality of the exemplary bw-meter. Neither should the computing environment 920 be interpreted as having any dependency or requirement relating to any one or combination of components illustrated in the exemplary computing environment 920.

The exemplary bw-meter is operational with numerous other general purpose or special purpose computing system environments or configurations. Examples of well known computing systems, environments, and/or configurations that may be suitable for use with the exemplary bw-meter include, but are not limited to, personal computers, server computers, thin clients, thick clients, hand-held or laptop devices, multiprocessor systems, microprocessor-based systems, set top boxes, programmable consumer electronics, wireless phone, wireless communication devices, network PCs, minicomputers, mainframe computers, distributed computing environments that include any of the above systems or devices, and the like.

The exemplary bw-meter may be described in the general context of computer-executable instructions, such as program modules, being executed by a computer. Generally, program modules include routines, programs, objects, components, data structures, etc. that perform particular tasks or implement particular abstract data types. The exemplary bw-meter may also be practiced in distributed computing environments where tasks are performed by remote processing devices that are linked through a communications network. In a distributed computing environment, program modules may be located in both local and remote computer storage media including memory storage devices.

As shown in FIG. 6, the computing environment 920 includes a general-purpose computing device in the form of a computer 930. The components of computer 920 may include, by are not limited to, one or more processors or processing units 932, a system memory 934, and a bus 936 that couples various system components including the system memory 934 to the processor 932.

Bus 936 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) buss also known as Mezzanine bus.

Computer 930 typically includes a variety of computer readable media. Such media may be any available media that is accessible by computer 930, and it includes both volatile and non-volatile media, removable and non-removable media.

In FIG. 6, the system memory includes computer readable media in the form of volatile, such as random access memory (RAM) 940, and/or non-volatile memory, such as read only memory (ROM) 938. A basic input/output system (BIOS) 942, containing the basic routines that help to transfer information between elements within computer 930, such as during start-up, is stored in ROM 938. RAM 940 typically contains data and/or program modules that are immediately accessible to and/or presently be operated on by processor 932.

Computer 930 may further include other removable/non-removable, volatile/non-volatile computer storage media. By way of example only, FIG. 6 illustrates a hard disk 944 for reading from and writing to a non-removable, non-volatile magnetic media (not shown and typically called a "hard drive"), a magnetic disk drive 946 for reading from and writing to a removable, non-volatile magnetic disk 948 (e.g., a "floppy disk"), and an optical disk drive 950 for reading from or writing to a removable, non-volatile optical disk 952 such as a CD-ROM, DVD-ROM or other optical media. The hard disk drive 944, magnetic disk drive 946, and optical disk drive 950 are each connected to bus 936 by one or more interfaces 954.

The drives and their associated computer-readable media provide nonvolatile storage of computer readable instructions, data structures, program modules, and other data for computer 930. Although the exemplary environment described herein employs a hard disk, a removable magnetic disk 948 and a removable optical disk 952, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 948, optical disk 952, ROM 938, or ROM 940, including, by way of example, and not limitation, an operating system 958, one or more application programs 960, other program modules 962, and program data 964.

A user may enter commands and information into computer 930 through input devices such as keyboard 966 and pointing device 968 (such as a "mouse"). Other input devices (not shown) may include a microphone, joystick, game pad, satellite dish, serial port, scanner, or the like. These and other input devices are connected to the processing unit 932 through an user input interface 970 that is coupled to bus 936, but may be connected by other interface and bus structures, such as a parallel port, game port, or a universal serial bus (USB).

A monitor 972 or other type of display device is also connected to bus 936 via an interface, such as a video adapter 974. In addition to the monitor, personal computers typically include other peripheral output devices (not shown), such as speakers and printers, which may be connected through output peripheral interface 975.

Computer 930 may operate in a networked environment using logical connections to one or more remote computers, such as remote computer 982. Remote computer 982 may include many or all of the elements and features described herein relative to computer 930.

Logical connections shown in FIG. 6 are a local area network (LAN) 977 and a general wide area network (WAN) 979. Such networking environments are commonplace in offices, enterprise-wide computer networks, intranets, and the Internet.

When used in a LAN networking environment, the computer 930 is connected to LAN 977 network interface or adapter 986. When used in a WAN networking environment, the computer typically includes a modem 978 or other means for establishing communications over the WAN 979. The modem 978, which may be internal or external, may be connected to the system bus 936 via the user input interface 970, or other appropriate mechanism.

Depicted in FIG. 6, is a specific implementation of a WAN via the Internet. Over the Internet, computer 930 typically includes a modem 978 or other means for establishing communications over the Internet 980. Modem 978, which may be internal or external, is connected to bus 936 via interface 970.

In a networked environment, program modules depicted relative to the personal computer 930, or portions thereof, may be stored in a remote memory storage device. By way of example, and not limitation, FIG. 6 illustrates remote application programs 989 as residing on a memory device of remote computer 982. It will be appreciated that the network connections shown and described are exemplary and other means of establishing a communications link between the computers may be used.

Exemplary Operating Environment

FIG. 6 illustrates an example of a suitable operating environment 920 in which the exemplary bw-meter may be implemented. Specifically, the exemplary bw-meter is implemented by any program 960-962 or operating system 958 in FIG. 6.

The operating environment is only an example of a suitable operating environment and is not intended to suggest any limitation as to the scope of use of functionality of the bw-meter described herein. Other well known computing systems, environments, and/or configurations that may be suitable for use with the bw-meter include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

Computer-Executable Instructions

An implementation of the exemplary bw-meter may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Computer Readable Media

An implementation of the exemplary bw-meter may be stored on or transmitted across some form of computer readable media. Computer readable media can be any available media that can be accessed by a computer. By way of example, and not limitation, computer readable media may comprise computer storage media and communications media.

Computer storage media include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Communication media typically embodies computer readable instructions, data structures, program modules, or other data in a modulated data signal such as carrier wave or other transport mechanism and included any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the fast dynamic measurement of bandwidth in a TCP network environment has been described in language specific to structural features and/or methodological steps, it is to be understood that the fast dynamic measurement of bandwidth in a TCP network environment defined in the appended claims is not necessarily limited to the specific features or steps described. Rather, the specific features and steps are disclosed as preferred forms of implementing the claimed fast dynamic measurement of bandwidth in a TCP network environment.

The invention claimed is:

1. A method for facilitating communication of packets between entities on a network through a communication device, the method comprising:

sending a pair of packets from a sending entity to a receiving entity;

sending at least one "push" packet after sending said pair of packets to avert a transmission delay between packets in the pair, wherein the size of the "push" packet is selected by the sending entity, in view of a Nagle Algorithm that is implemented by the communication device, to be specifically configured to force the transmission of the pair of packets by the communication device to avoid the transmission delay caused by packet buffering by the communication device on the network.

2. A method as recited in claim 1, wherein the pair of packets includes two packets sent back-to-back.

3. A method as recited in claim 1, wherein the pair of packets are bandwidth-measurement packets for measuring bandwidth between the sending entity and the receiving entity.

4. A method as recited in claim 1, wherein the communication device is a proxy server.

5. A method as recited in claim 1, wherein the network is TCP.

6. A program module having computer-executable instructions stored on a computer storage medium that, when executed by a computer, performs the method as recited in claim 1 at an application layer in accordance with an OSI model.

7. A method as recited in claim 1, wherein the "push" packet is sent from the sending entity.

8. A method as recited in claim 1, wherein the communication comprises a device other than the sending entity or the receiving entity.

9. A method as recited in claim 1, wherein the packet buffering causing the transmission delay is characterized by a buffering action where one or more of the set of packets are buffered into a packet buffer, wherein the transmission delay is a result of the packet buffering.

10. A system for facilitating bandwidth measurement between two entities on a network through a communication device, the method comprising:

means for sending a pair of bandwidth-measurement packets from a sending entity to a receiving entity;

means for sending, thereafter, at least one "push" packet to avert a transmission delay between packets in the pair, wherein the size of the "push" packet is selected by the sending entity, in view of a Nagle Algorithm that is implemented by a proxy device, to be specifically configured to force the transmission of the pair of packets by the proxy device to avoid the transmission delay caused by packet buffering by the proxy device on the network.

11. A system as recited in claim 10 further comprising means for receiving a bandwidth calculation based upon measurements related to the pair of packets.

12. A system as recited in claim 10, wherein the "push" packet is sent from the sending entity.

13. A system as recited in claim 10, wherein the communication device comprises a device other than the sending entity or the receiving entity.

14. A system as recited in claim 10, wherein the packet buffering causing the transmission delay is characterized by a buffering action where one or more of the pair of packets are buffered into a packet buffer, wherein the transmission delay is a result of the packet buffering.

15. A computer-readable storage medium storing computer-executable instructions that, when executed by a computer, perform a method to facilitate communication of packets between entities on a network through a communication device, the method comprising:

sending a pair of packets from a sending entity to a receiving entity;

sending at least one "push" packet to avert a transmission delay between packets in the pair, wherein the size of the "push" packet is selected by the sending entity, in view of a Nagle Algorithm that is implemented by the communication device, to be specifically configured to force the transmission of the pair of packets by the communication device to avoid the transmission delay caused by packet buffering by the communication device on the network.

16. An apparatus comprising:

a processor;

a transmission-delay avoider executable on the processor to:

send a pair of packets from a sending entity to a receiving entity through a communication device;

send at least one "push" packet thereafter to avert a transmission delay between packets in the pair, wherein the size of the "push" packet is selected by the sending entity, in view of a Nagle Algorithm that is implemented by the communication device, to be specifically configured to force the transmission of the pair of packets by the communication device to avoid the transmission delay caused by packet buffering by the communication device on the network.

* * * * *